United States Patent
Gretz

(10) Patent No.: US 7,304,235 B1
(45) Date of Patent: Dec. 4, 2007

(54) ELECTRICAL BOX ASSEMBLY FOR RECESSED MOUNTING OF HIGH AND LOW VOLTAGE COMPONENTS

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 11/713,381

(22) Filed: Mar. 2, 2007

(51) Int. Cl.
*H01H 9/02* (2006.01)

(52) U.S. Cl. .............. 174/58; 174/50; 174/54; 174/63; 248/200; 361/600; 220/3.8

(58) Field of Classification Search .............. 174/50, 174/58, 57, 53, 54, 61, 63, 135; 220/3.2, 220/3.3, 3.8, 4.02; 248/121, 126, 200, 906; 361/600; 439/535
See application file for complete search history.

(56) References Cited

U.S. PATENT DOCUMENTS

| | | | |
|---|---|---|---|
| 4,265,365 A * | 5/1981 | Boteler | 220/3.3 |
| 5,466,886 A | 11/1995 | Lengyel et al. | |
| 6,147,304 A | 11/2000 | Doherty | |
| 6,747,206 B1 * | 6/2004 | Law | 174/53 |
| 6,956,168 B2 | 10/2005 | Herth | |
| 7,038,132 B1 | 5/2006 | Lowe et al. | |
| 7,075,004 B1 | 7/2006 | Gretz | |
| 7,078,618 B2 * | 7/2006 | Dinh | 174/481 |

* cited by examiner

*Primary Examiner*—Dhiru R. Patel

(57) ABSTRACT

An electrical box assembly for providing electrical service and signal line hookups to a television or home entertainment center. The electrical box assembly can be recessed within the wall to make it unobtrusive and out of the way. The box assembly includes an integral electrical box for housing line voltage connections and connection points for several low voltage openings. The low voltage connection points are capable of accepting standard jacks for broadband cable, direct TV, surround sound cabling, or phone systems. The electrical box assembly enables easy consolidation of all the various electrical and signal hookups for TV or home entertainment systems.

15 Claims, 11 Drawing Sheets

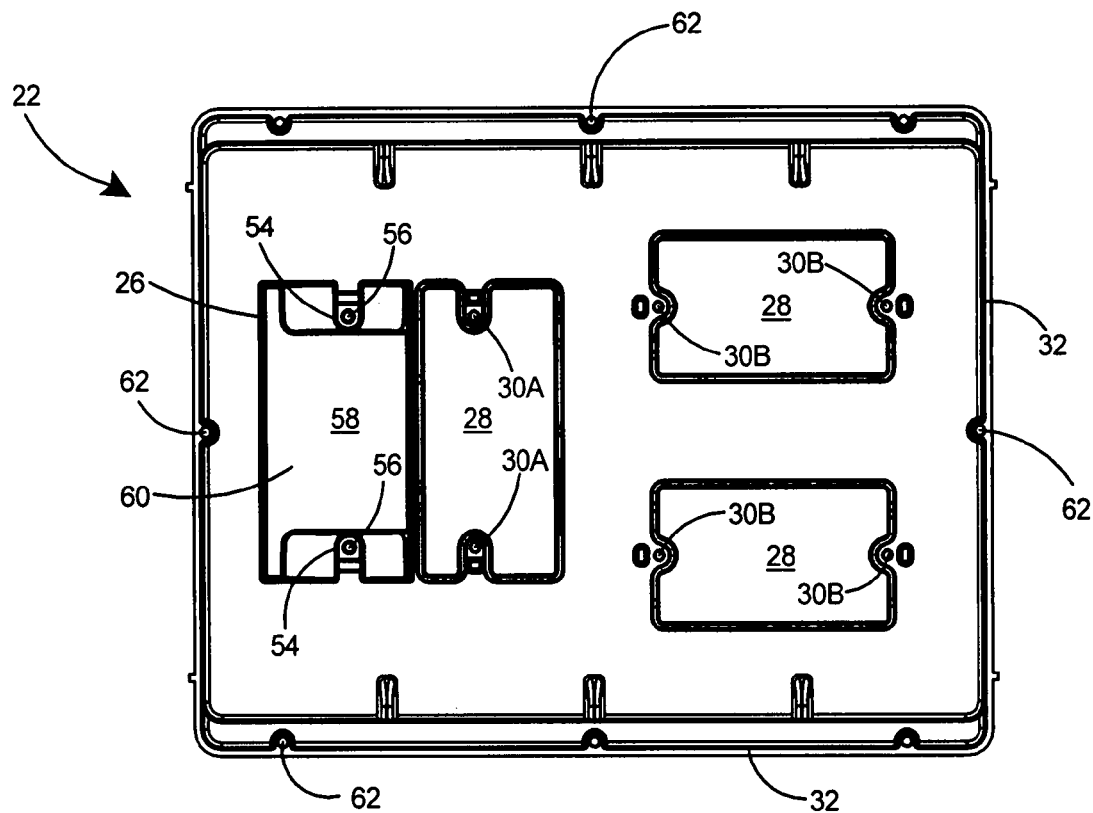
Fig. 3
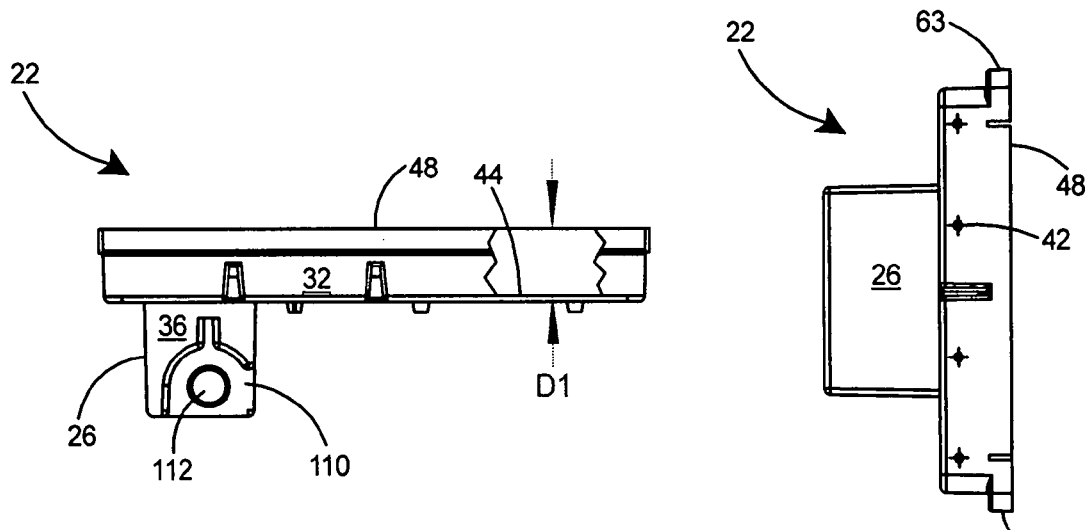
Fig. 4
Fig. 4A

US 7,304,235 B1

ELECTRICAL BOX ASSEMBLY FOR RECESSED MOUNTING OF HIGH AND LOW VOLTAGE COMPONENTS

FIELD OF THE INVENTION

This invention relates to electrical box assemblies for mounting components for high and low voltage devices and specifically to a flat panel TV box assembly that can be easily installed on an interior wall of a building and provide electrical services and cable TV connections to a television, computer, or home stereo system.

BACKGROUND OF THE INVENTION

With the proliferation of high definition televisions and various auxiliary devices, such as digital videodisc players, game stations, and surround sound systems, there is a need to manage the connections between these devices to ensure there is adequate power and also to manage the myriad of cables and cords that accompany such systems. Additionally, many electrical boxes for both high and low voltage components mount the components flush with the wall, which makes the plugs or connectors that mate with the wall-mounted components susceptible to damage, such as when devices, such as vacuum cleaners or other household hazards brush against the plugs or connectors.

What is needed therefore is an electrical box assembly that provides connection points for both high and low voltage components, provides isolation of high voltage connections from low voltage connections, provides features for managing the plethora of cables and wiring associated with modern television systems, and recesses the end connector of cords or cables to protect the plug ends of cords or end connectors of cables from undesirable contact with household appliances or household occupants.

SUMMARY OF THE INVENTION

The invention is an electrical box assembly that provides electrical service including line voltage and signal line hookups for a television or home entertainment center. The electrical box assembly can be recessed within the wall to make it unobtrusive and out of the way. The box assembly includes an integral electrical box for housing line voltage connections and connection points for several low voltage openings. The low voltage connection points are capable of accepting standard jacks for broadband cable, direct TV, surround sound cabling, or phone systems. The electrical box assembly enables easy consolidation of all the various electrical and signal hookups for TV or home entertainment systems.

OBJECTS AND ADVANTAGES

The electrical box assembly of the present invention includes several advantages over the prior art, including:
(1) Connection points are provided for mounting both high and low voltage components. An electrical box, integral with the box member of the assembly, is provided for housing and isolating high voltage components, such as a duplex receptacle to provide line voltage to a TV or other electrical device. Connection points are also provided for mounting several low voltage components, such as a coupling plate for a coaxial cable.
(2) The electrical box assembly includes a backward projecting box portion that mounts within a wall, thereby recessing electrical devices within the wall to render them unobtrusive and out of the way. By recessing the electrical devices, the plug ends of cords or end connectors of cables are advantageously protected from undesirable contact with household appliances, household occupants, or other hazards.
(3) The electrical box assembly provides features for managing the plethora of cables and wiring associated with modern television systems, including integral loops for bundling and tying-off wires and cables, thereby providing a clean installation that is unobtrusive and minimizes excessive wires and cables running between the wall and the television, speaker system, or other components of a home entertainment system. The loops are positioned against the back wall of the box member, thereby positioning the wires and cables along the back wall of the assembly and advantageously recessing them behind the wall surface and away from household hazards.

These and other objects and advantages of the present invention will be better understood by reading the following description along with reference to the drawings.

DESCRIPTION OF THE DRAWINGS

FIG. 3 is a front view of the box member of FIG. 2.

FIG. 4 is a bottom view of the box member of FIG. 3.

FIG. 4A is a side view of the box member of FIG. 3.

TABLE OF NOMENCLATURE

Figure 1:
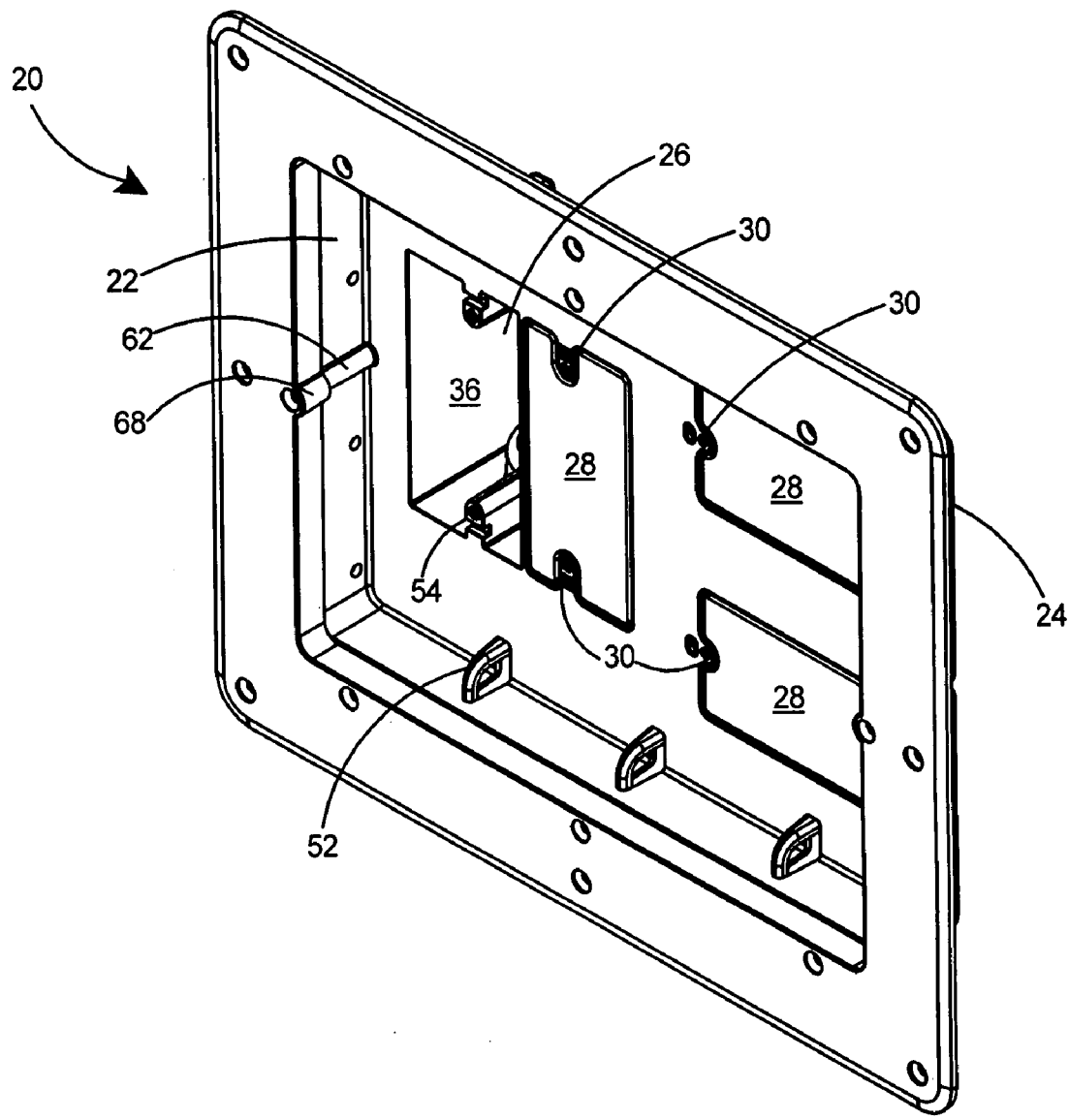
FIG. 1 is a perspective view of the preferred embodiment of a flat panel TV box assembly according to the present invention.

The following is a listing of part numbers used in the drawings along with a brief description:

| Part Number | Description |
| --- | --- |
| 20 | electrical box assembly |
| 22 | box member |
| 24 | frame member |
| 26 | electrical box |
| 28 | open area |
| 30 | connection point |
| 30A | vertically oriented connection point |
| 30B | horizontally oriented connection point |
| 32 | peripheral wall of box member |
| 34 | back wall of box member |
| 36 | sidewalls of electrical box |
| 38 | side of open area |
| 40 | sidewall portion of peripheral wall |
| 42 | aperture in sidewall of box member |
| 44 | inner edge of peripheral wall |
| 46 | juncture of peripheral wall and back wall |
| 48 | outer edge of peripheral wall |
| 50 | bottom wall |
| 52 | loop member |
| 54 | boss of electrical box |
| 56 | threaded bore |
| 58 | rear wall of electrical box |
| 60 | high voltage enclosure |
| 62 | boss on peripheral wall of box member |
| 63 | flared portion on sidewalls of peripheral wall |
| 64 | peripheral flange of frame member |
| 65 | transverse flange of frame member |
| 68 | guide member |
| 69 | inner edge of transverse flange |
| 70 | aperture in transverse flange |
| 72 | attachment arrangement |
| 74 | fastener for securing frame to box member |
| 76 | aperture for low voltage component |
| 78 | hole |
| 80 | sheet rock |
| 82 | wall |
| 84 | stud |
| 86 | mounting arrangement |
| 87 | fastener |
| 88 | mounting fastener |
| 89 | apertures in transverse flange |
| 90 | duplex receptacle |
| 92 | fastener |
| 94 | cover plate |
| 96 | CATV connector plate |
| 98 | fastener |
| 99 | outer edge of electrical box assembly |
| 100 | plug end |
| 102 | electrical cord |
| 104 | horizontally oriented CATV connector |
| 106 | vertically oriented CATV connector |
| 108 | telephone jack |
| 110 | depressed area |
| 112 | removable wall portion or knockout |
| 114 | push-in electrical connector |
| 120 | electrical box assembly, second embodiment |
| 122 | one-piece box member |
| 124 | peripheral wall |
| 126 | flange |
| 128 | mounting arrangement |
| 130 | bottom wall |
| D1 | depth of peripheral wall |

DETAILED DESCRIPTION OF THE INVENTION

FIG. 1 depicts a preferred embodiment of an electrical box assembly 20 according to the present invention. The recessed electrical box assembly 20 includes a box member 22 and a frame member 24. The box member 22 includes an electrical box 26 for accommodating high voltage components (not shown) and open areas 28 having connection points 30 for accommodating low voltage components (not shown).

Figure 2:
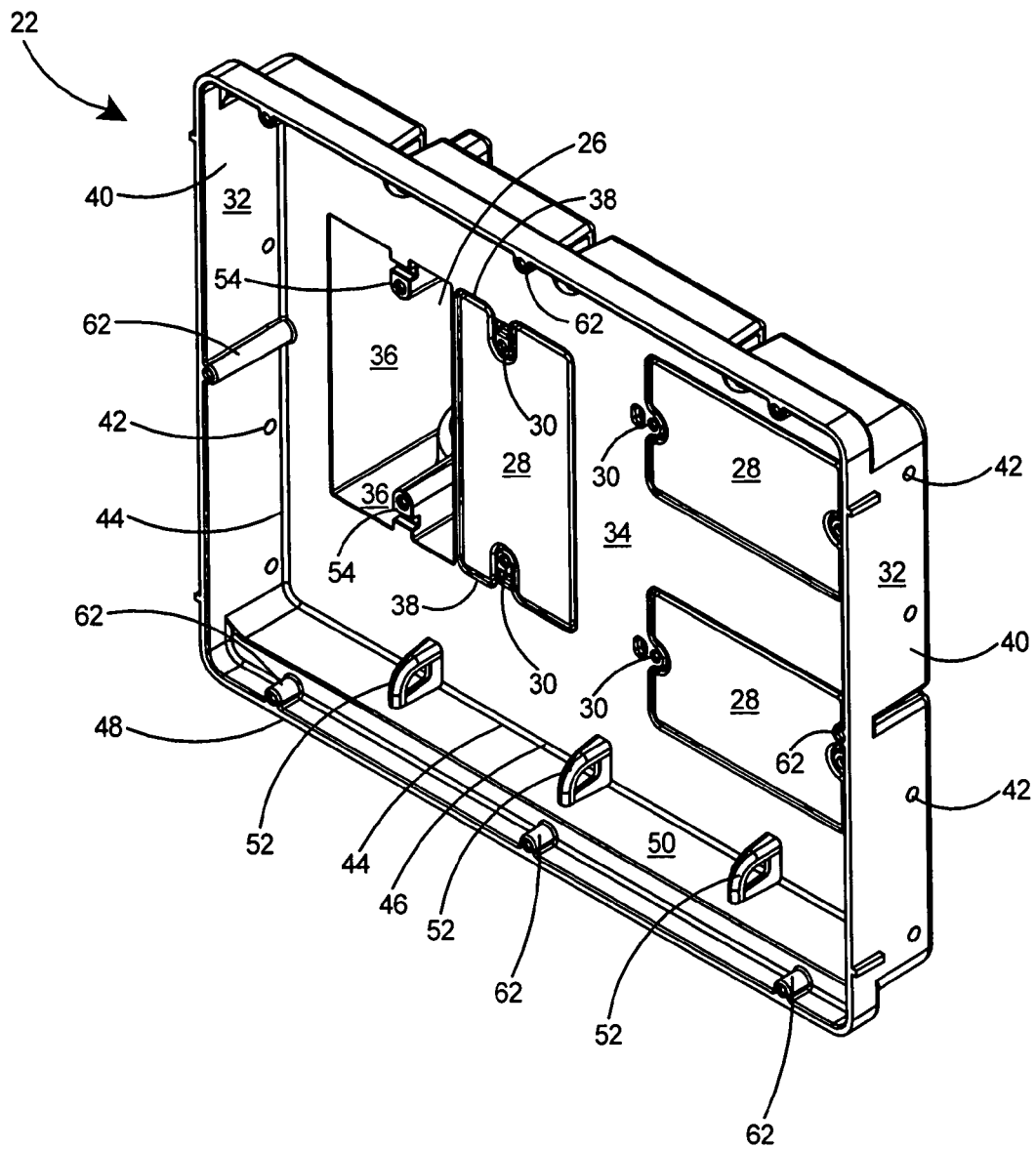
FIG. 2 is a perspective view of a box member that forms a portion of the flat panel TV box assembly of FIG. 1.9)

With reference to FIG. 2, a preferred embodiment of the box member 22 includes a forward extending peripheral wall 32 and a back wall 34. The electrical box 26 includes sidewalls 36 and is integral with the back wall 34 of the box member 22. The connection points 30 are provided on the back wall 34 of the box member 22 typically on opposing sides 38 of the open areas 28. The peripheral wall 32 of the box member 22 includes sidewalls 40 and apertures 42 are provided in the sidewalls 40. The peripheral wall 32 of the box member 22 includes an inner edge 44 at a juncture 46 with the back wall 34 of the box member 22 and an outer edge 48 with the apertures 42 in the peripheral wall 32 adjacent or very close to the inner edge 44. The peripheral wall 32 of the box member 22 includes a bottom wall 50 and loop members 52 in linear alignment along the bottom wall 50. The loop members 52 extend across the juncture 46 of the bottom wall 50 and the back wall 34. The electrical box 26 includes bosses 54 that are integral with the sidewalls 36 of the electrical box 26.

Referring to FIGS. 3-4A, threaded bores 56 are provided in the bosses 54 of the electrical box 26. The electrical box 26 includes a rear wall 58 that closes the rear of the electrical box and provides a high voltage enclosure 60 therein. As shown at the cutaway portion of the peripheral wall 32 in FIG. 4, the peripheral wall 32 of the box member 22 includes a depth D1 as measured from the inner edge 44 to the outer edge 48. The box member 22 includes a plurality of bosses 62 extending inward from the peripheral wall 32. The peripheral wall 32 of the box member 22 further includes a flared portion 63 near the outer edge 48 at both the top and bottom ends of the peripheral wall 32. As shown in FIG. 3, the connection points 30 for the low voltage components may include connection points 30A aligned for vertical connection of the low voltage components and connection points 30B aligned for horizontal connection of the low voltage components.

Figure 5:
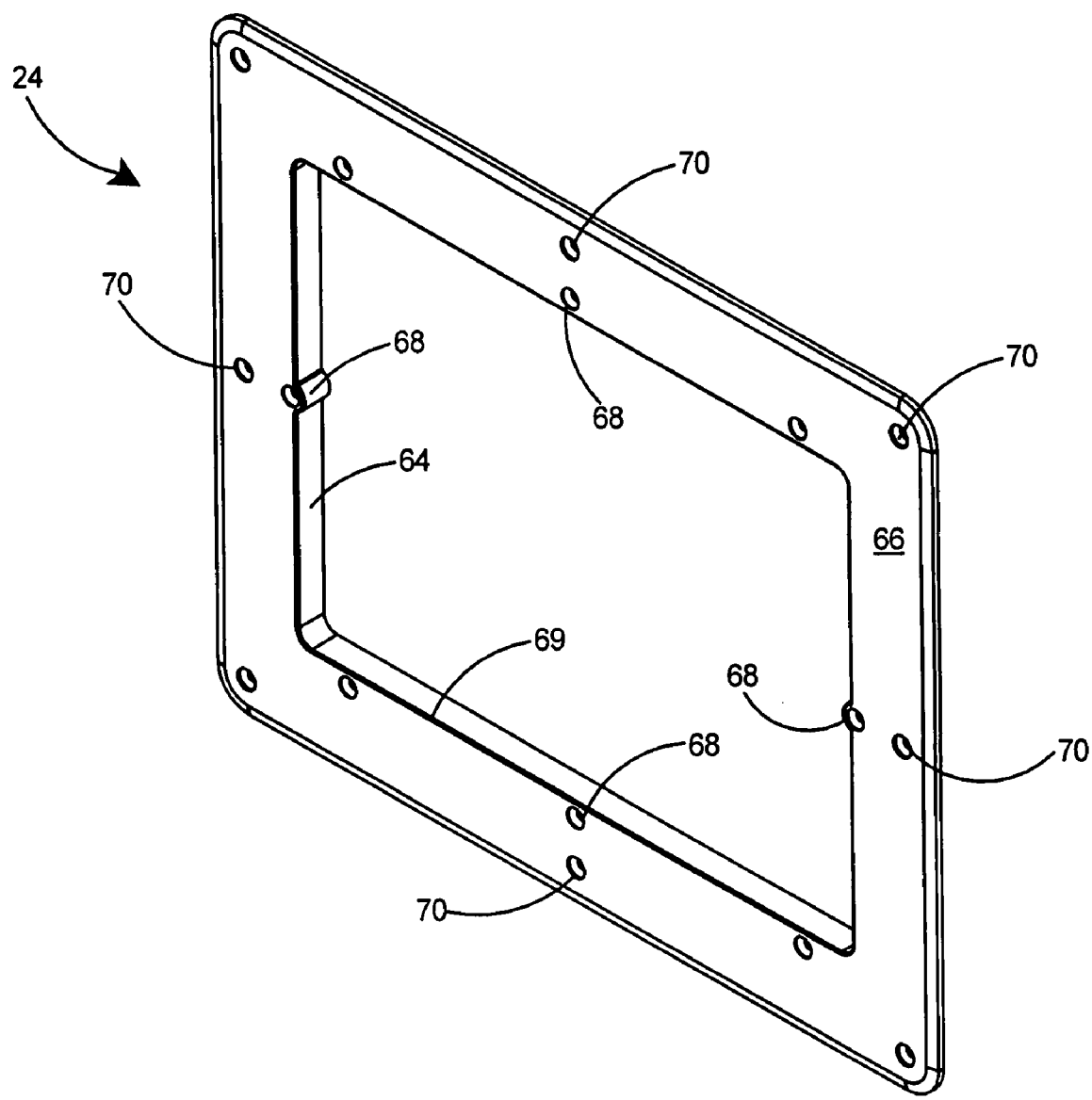
FIG. 5 is a perspective view of a frame member that forms a portion of the flat panel TV box assembly of FIG. 1.
Figure 6:
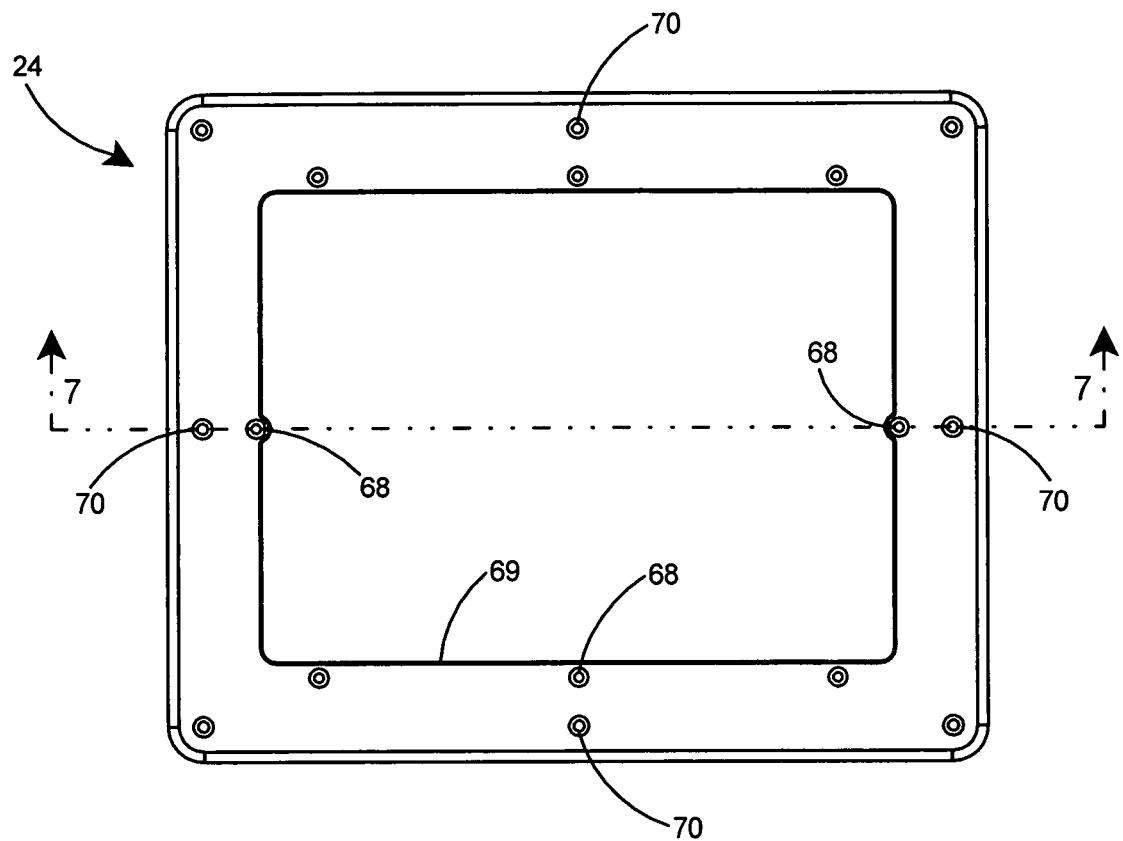
FIG. 6 is a front view of the frame member of FIG. 5.
Figure 7:
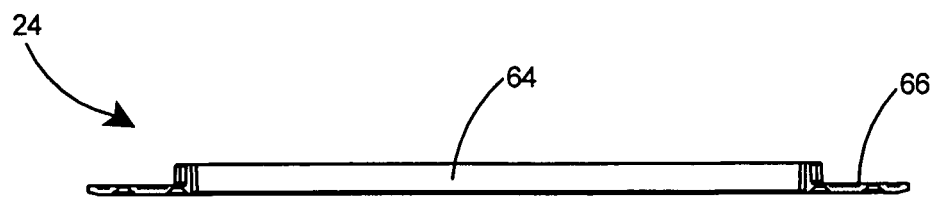
FIG. 7 is a sectional view of the frame member taken along line 7-7 of FIG. 6.

With reference to FIGS. 5-7, a preferred embodiment of the frame member 24 includes a rearward extending peripheral flange 64 and a transversely extending flange 66. A plurality of guide members 68 is provided on the peripheral flange 64, with each guide member 68 positioned along the inner edge 69 of the transverse flange 66 of the frame member 24. The transverse flange 66 of the frame member 24 includes apertures 70 therein.

Figure 8:
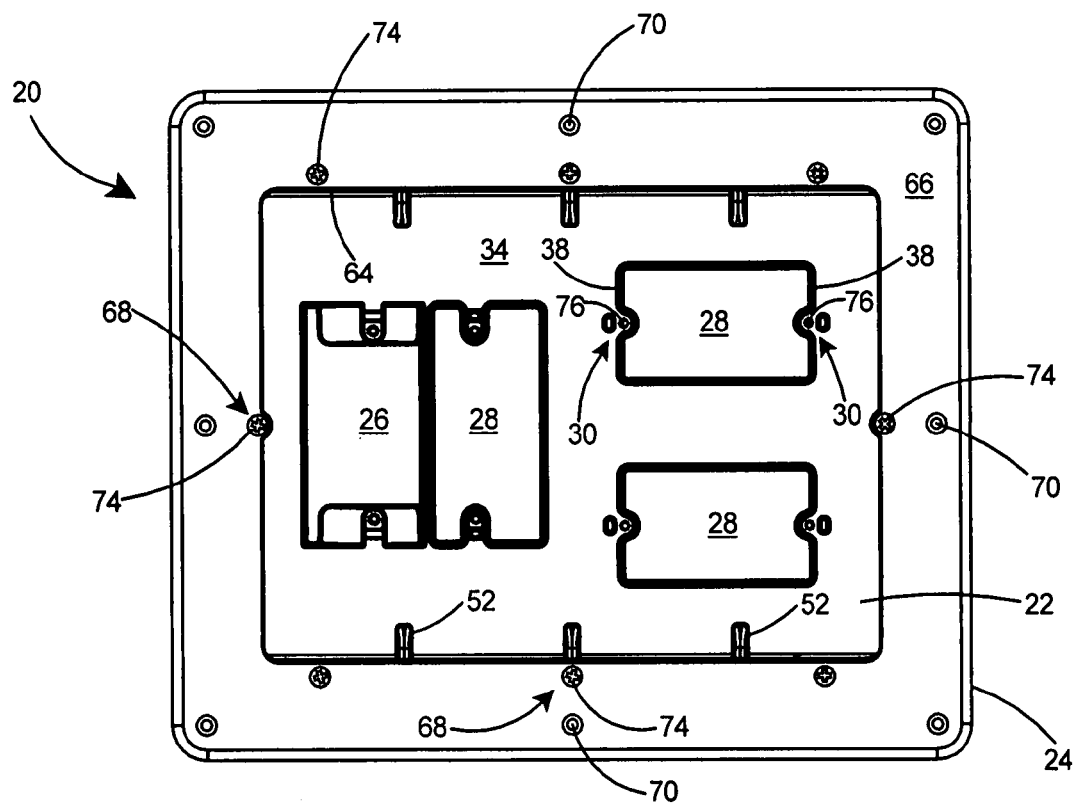
FIG. 8 is a front view of the flat panel TV box assembly of FIG. 1.
Figure 9:
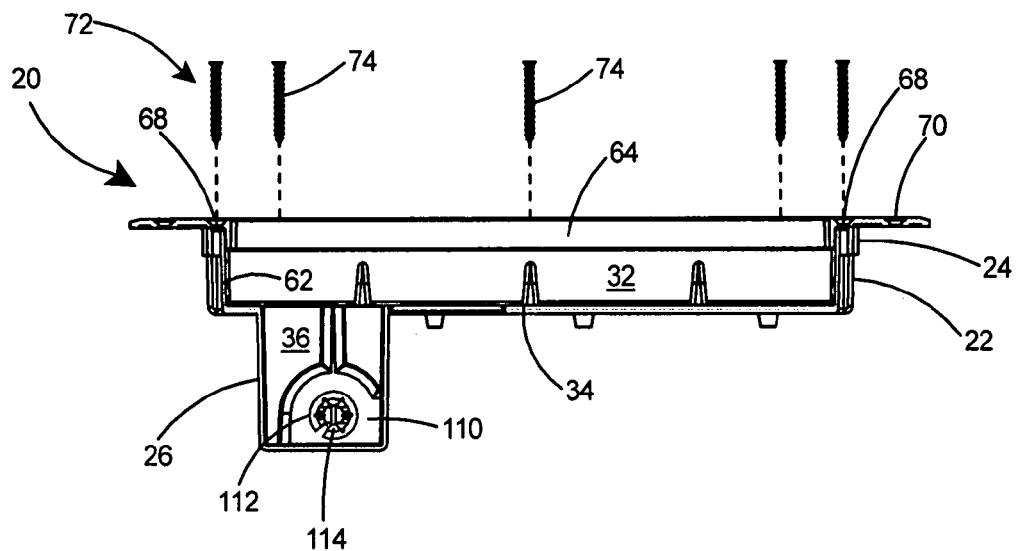
FIG. 9 is a bottom view of the flat panel TV box assembly of FIG. 8.

Referring to FIGS. 8 and 9, there is shown an attachment arrangement 72 for securing the frame member 24 to the box member 22 to create the recessed electrical box assembly 20 of the present invention. The attachment arrangement 72 includes fasteners 74 which are secured through each guide member 68 on the peripheral flange 64 of the frame member 24 into a corresponding boss 62 (see FIG. 2) on the peripheral wall 32 of the box member 22. To secure the frame member 24 to the box member 22, the peripheral flange 64 of the frame member 24 is aligned with the peripheral wall 32 of the box member 22. With the frame member 24 thus aligned with the box member 22, each guide member 68 in the frame 24 is aligned with a corresponding boss 62 in the box member 22. As shown in FIG. 8, the connection points 30 for low voltage components (not shown) include apertures 76 on opposing sides 38 of the open areas 28 in the back wall 34 of the box member 22.

Figure 10:
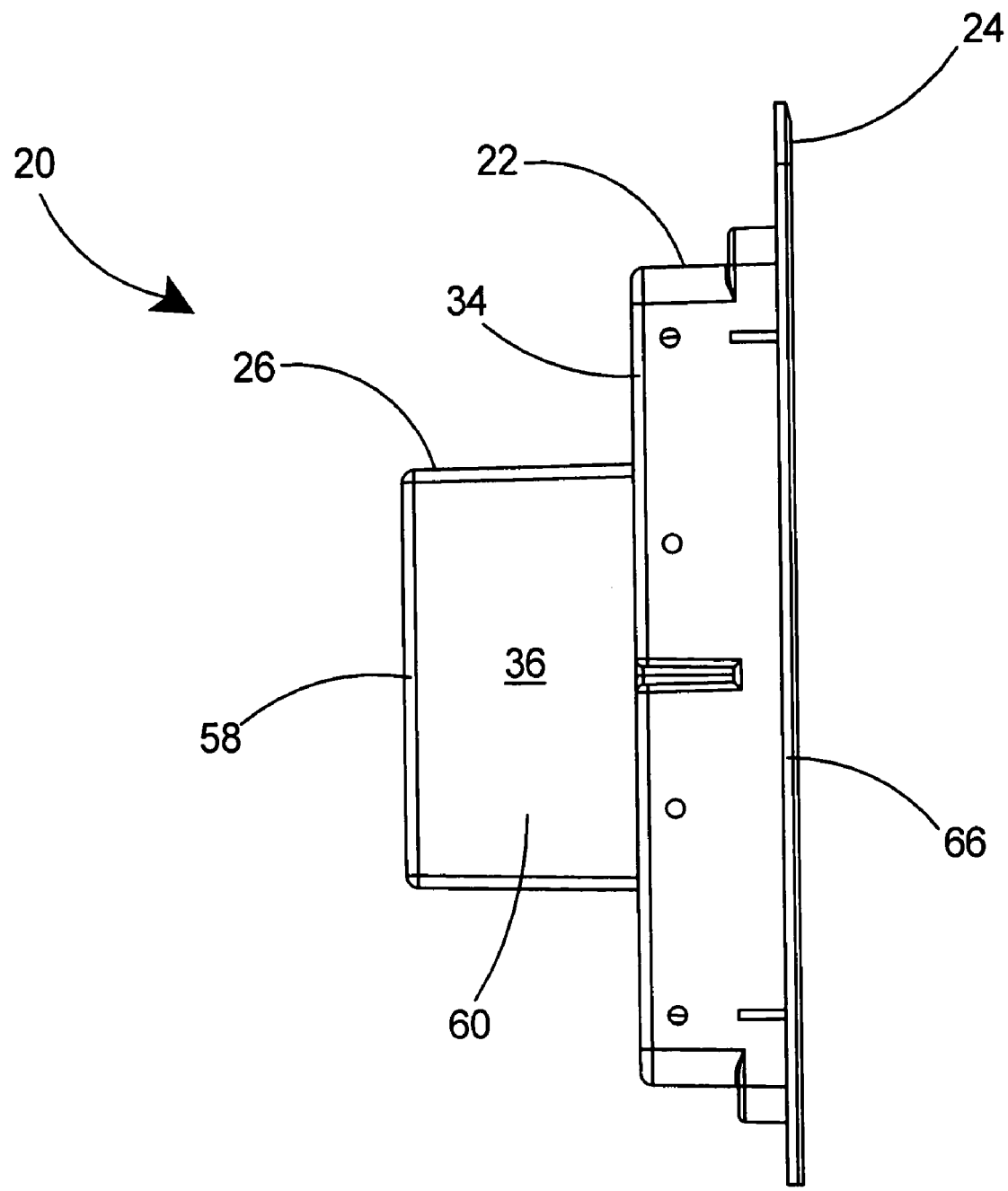
FIG. 10 is a side view of the flat panel TV box assembly of FIG. 8.

As shown in FIG. 10, after the frame member 24 is secured to the box member 22 to form electrical box assembly 20, the electrical box 26 projects from the back-wall 34 of the box member 22 and the sidewalls 36 and rear wall 58 of the electrical box 26. The sidewalls 36 and rear wall 58 of the electrical box 26 thereby create a high voltage enclosure 60 that isolates any high voltage wiring or components therein (not shown) from nearby low voltage components.

Figure 11:
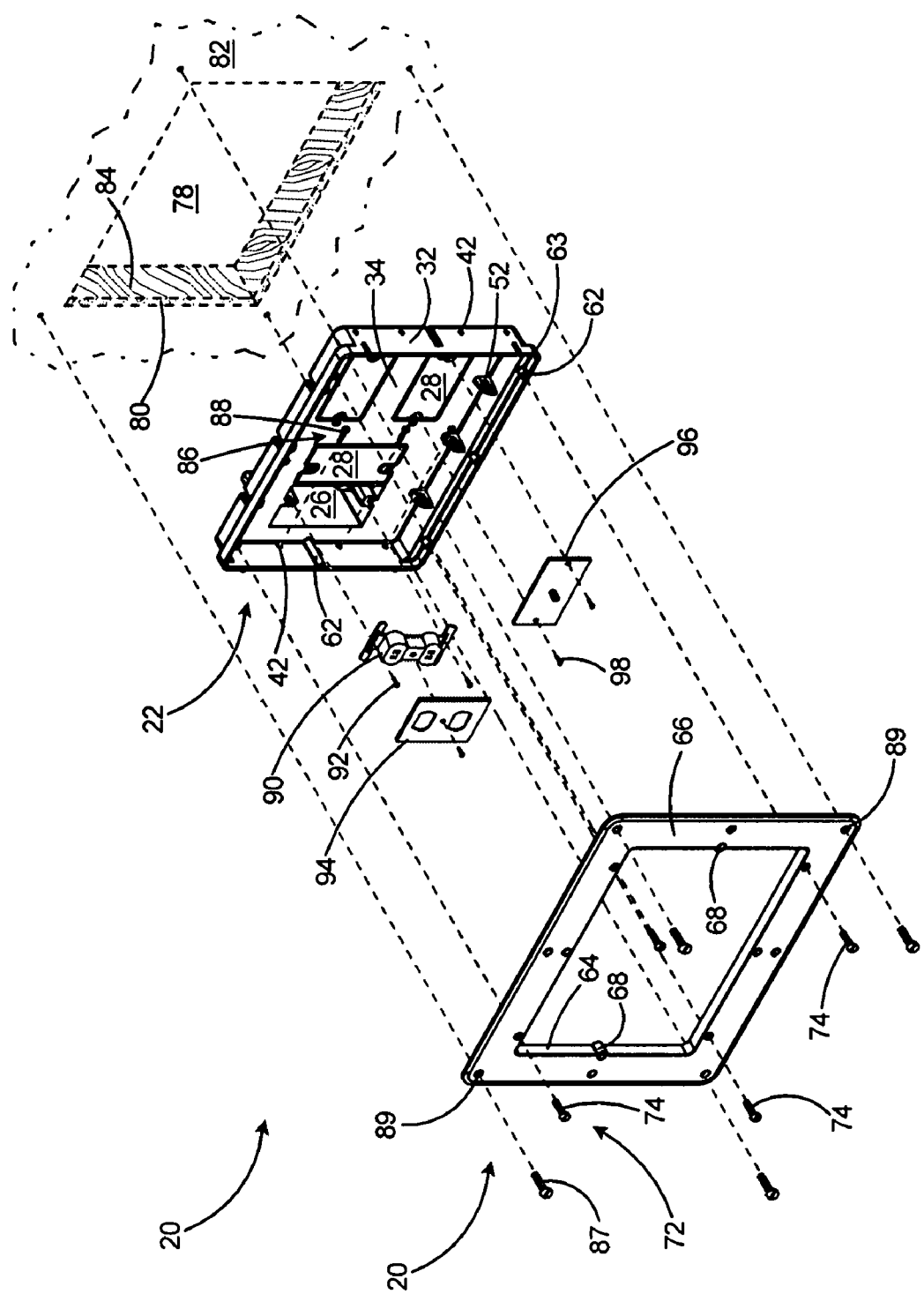
FIG. 11 is an exploded perspective view of the flat panel TV box assembly of the present invention including some high and low voltage components in alignment with the box assembly to be installed therein.

For operation of the electrical box assembly 20 of the present invention, reference is made to FIG. 11. An installer first cuts a hole 78 in the sheet rock 80 or similar wall covering on a wall 82 thereby exposing a stud 84. The box member 22 is inserted into the hole 78 until the transverse flange 66 is flush with the surrounding wall 82. The electrical box assembly 20 includes a mounting arrangement 86 for securing the box member 22 to the stud 84 and thereby positioning the back wall 34 of the box member substantially within the wall 82. The mounting arrangement 86 for securing the box member 22 to the stud 84 includes mounting fasteners 88 that are secured through the apertures 42 in the peripheral wall 32 and into the stud 84 thereby securing the box member 22 to the stud 84. After the box member 22 is secured to the stud 84, the frame member 24 is secured to the box member 22 by tightening the fasteners 74 of the attachment arrangement 72 through the guide members 68 of the frame 24 and into the bosses 62 on the peripheral wall 32 of the box member 22. As an alternative to fastening the frame 24 to the box member 22 with the attachment arrangement, the frame 24 may be secured directly to the wall 82 by driving fasteners 87 through alternative apertures 89 in the transverse flange 66 into the wall 82. A high voltage component such as the duplex power receptacle 90 can be secured to the electrical box 26 by fasteners 92 and a cover plate 94 attached thereto. Low voltage components such as the CATV connector plate 96 can then be secured with fasteners 98 to the connection points 30 surrounding the open areas 28.

Figure 12:
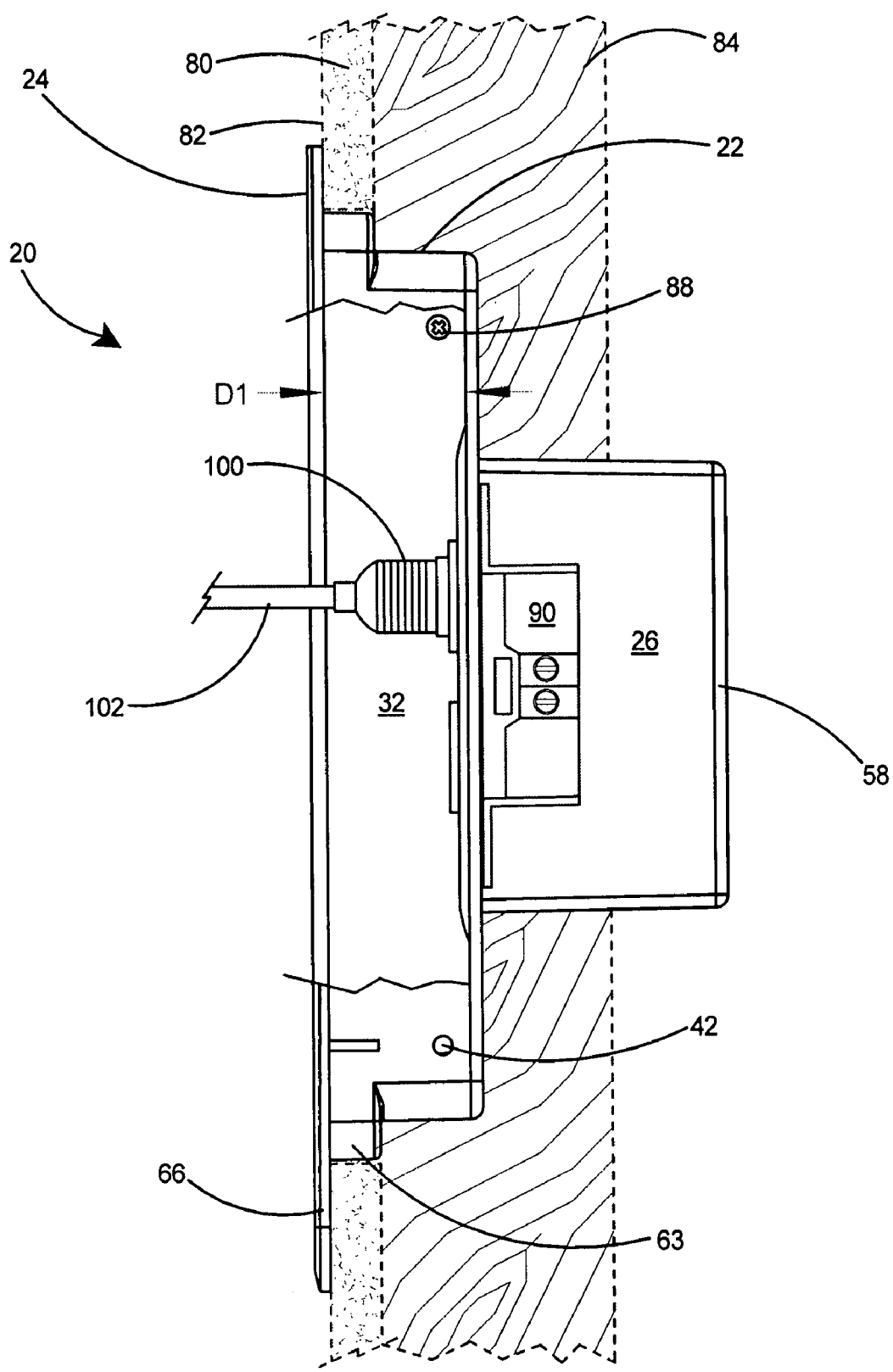
FIG. 12 is a side view of the flat panel TV box assembly with a portion of the frame member and box member cut away to show a duplex power receptacle and an electrical cord plugged therein.

Referring to FIG. 12, after the electrical box assembly 20 is secured to the wall 82 and electrical components installed therein, all electrical components, such as the duplex receptacle 90 shown, are recessed within the wall 82 by at least the depth D1 of the peripheral wall 32 of the box member 22. Preferably the electrical components are recessed from the outer edge 99 of the electrical box assembly 20 by between 1 and 2 inches. Most preferably, the electrical components are recessed from the outer edge 99 of the electrical box assembly 20 by at least 1.5 inches. With the electrical box assembly 20 recessed within the wall 82 as shown, the plug ends 100 of cords 102 or connector ends of low voltage cables (not shown) are protected from being dislodged by contact from vacuum cleaners or similar hazards.

Figure 13:
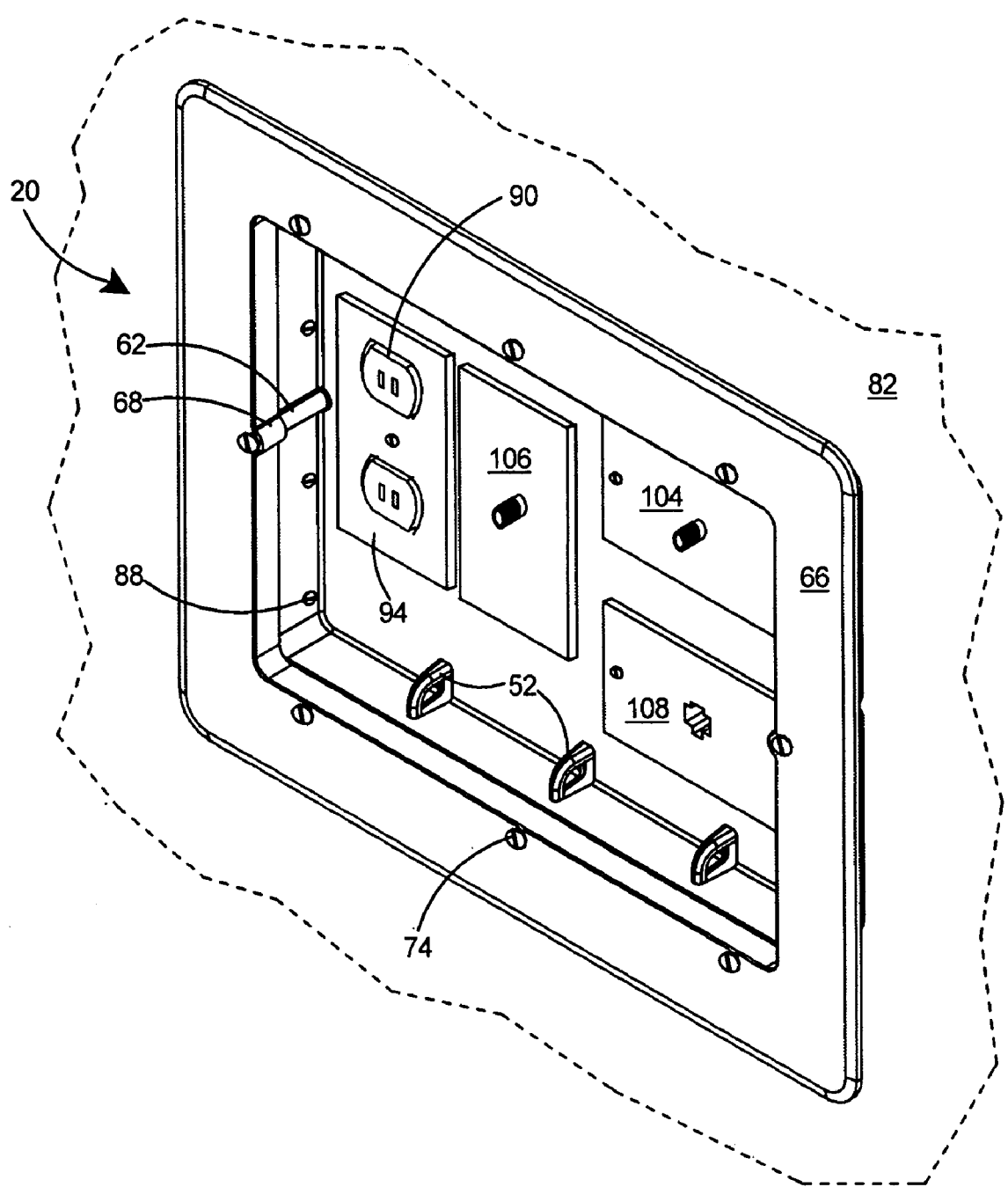
FIG. 13 is a perspective view of a flat panel TV box assembly according to the present invention installed in a wall and with high and low voltage components installed therein.

With reference to FIG. 13 there is shown a completed installation of an electrical box assembly 20 of the present invention in a wall 82. The electrical box assembly 20 includes a duplex receptacle 90 and cover plate 94, a horizontally oriented CATV connector 104, a vertically oriented CATV connector 106, and a horizontally oriented telephone jack 108.

As shown in FIG. 4 or 9, the electrical box 26 of the present invention may include a depressed area 110 in one of the sidewalls 36 and a knockout or removable wall portion 112 therein in the depressed area 110. The depressed area 110 in the sidewall 36 enables the use of electrical fittings or connectors such as the Black Button™ push-in connector 114 for connecting non-metallic cable to electrical boxes, which is available from Arlington Industries of Scranton, Pa. The depressed area 110 permits use of the connectors 114 without projecting from the sidewall 36 and interfering with placement of the electrical box assembly 20 in locations where space is tightly restricted.

Figure 14:
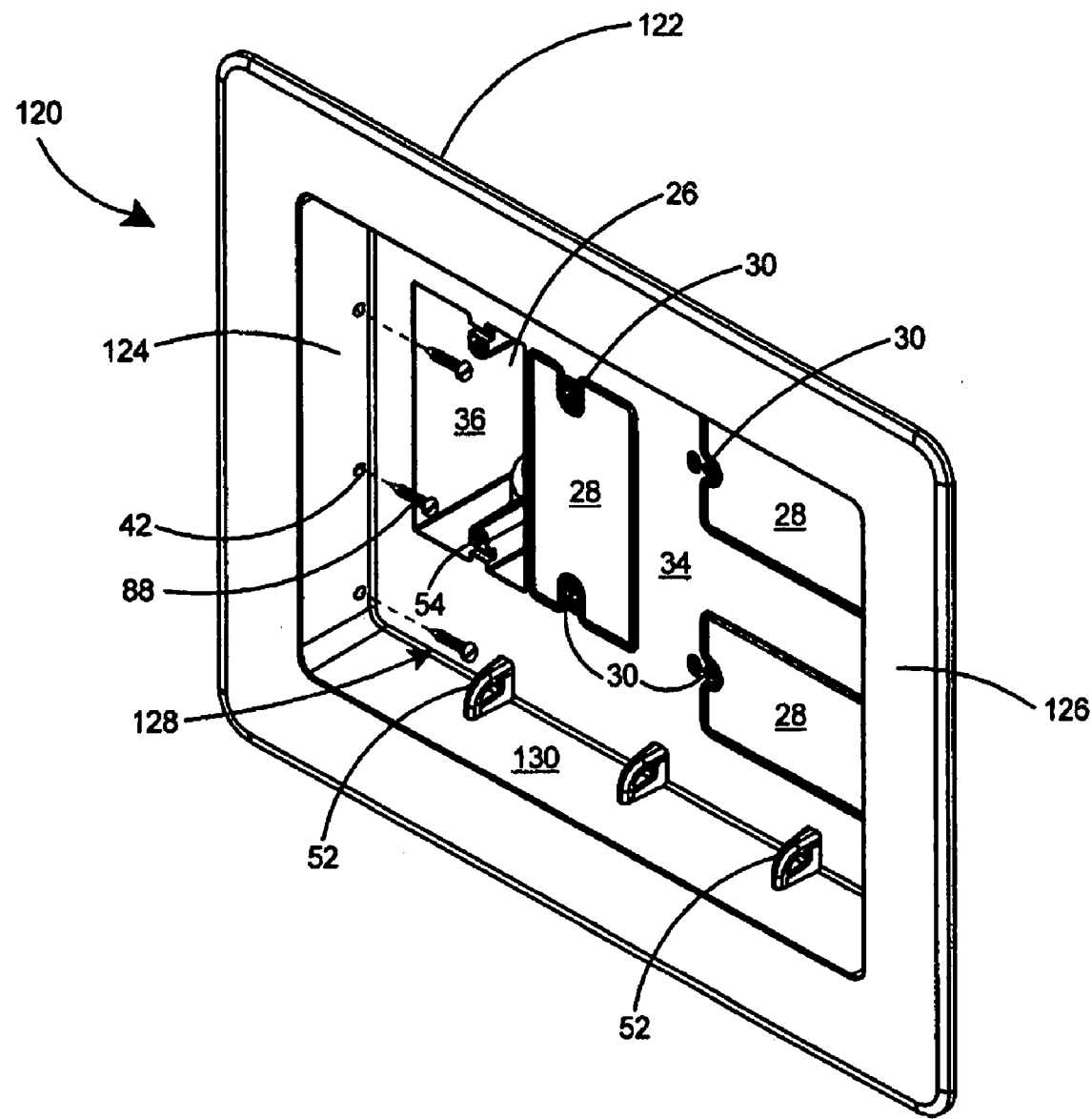
FIG. 14 is a perspective view of a second embodiment of a flat panel TV box assembly according to the present invention.

With reference to FIG. 14 there is shown a second embodiment of the electrical box assembly 120 of the present invention. The second embodiment of the electrical box assembly 120 is a one-piece electrical box assembly wherein the box member 122 includes a forward extending peripheral wall 124 and a transverse flange 126 all provided in one piece. The box member 122 includes a back wall 34 and one or more openings 28 in the back wall 34. One or more of the openings 28 in the back wall 34 of the box member 122 may include an electrical box 26. The electrical box 26 includes sidewalls 36 integral with and extending rearward from the back wall 34 of the box member 122. The openings 28 in the back wall 34 of the one-piece box member 122 include connection points 30 for securing the electrical components (not shown) thereto. A mounting arrangement 128 is provided for securing the box member 122 to a wall in such a manner that the installed electrical components (not shown) are recessed within the wall. The peripheral wall 124 of the box member 122 includes a bottom wall 130 and loop members 52 in linear alignment along the bottom wall 130.

The electrical box assembly 20 of the present invention could be constructed of metal or plastic but most preferably the box member 22 of the present invention is molded in one piece of plastic and the frame member 24 is also molded in one piece of plastic. Suitable plastics include polycarbonate and polyvinylchloride.

Having thus described the invention with reference to a preferred embodiment, it is to be understood that the invention is not so limited by the description herein but is defined as follows by the appended claims.

What is claimed is:

1. An electrical box assembly comprising:
   a box member including a forward extending peripheral wall and a back wall;
   a frame member including a rearward extending peripheral flange and a transverse flange;
   an electrical box extending from said back wall of said box member;
   connection points on said back wall of said box member for securing low voltage components thereto;
   a mounting arrangement for securing said box member to a wall and thereby positioning said back wall of said box member substantially within the wall;
   an attachment arrangement for securing said frame member to said box member;
   said peripheral wall of said box member includes a bottom wall; and
   loop members in linear alignment along said bottom wall.

2. The electrical box assembly of claim 1 wherein said peripheral wall of said box member includes a depth; and
   a high voltage component secured within said electrical box and a low voltage component secured to said connection points positions the high and low voltage components within the wall by at least said depth of said peripheral wall of said box member.

3. The electrical box assembly of claim 2 wherein said depth is between 1 and 2 inches.

4. The electrical box assembly of claim 1 wherein said bottom wall of said box member includes a juncture with said back wall of said box member; and
   said loop members extend across said juncture of said bottom wall and said back wall.

5. The electrical box assembly of claim 1 including sidewalls and a rear wall on said electrical box;
   bosses integral with said sidewalls of said electrical box; and threaded bores in said bosses for receipt of fasteners for securing a high voltage component thereto.

6. The electrical box assembly of claim 5 including
a recessed area in one of said sidewalls of said electrical box; and
a removable wall portion in said recessed area of said sidewall of said electrical box.

7. The electrical box assembly of claim 1 wherein said connection points for the low voltage components include an opening in said back wall of said box member and apertures on opposing sides of said opening in said back wall of said box member.

8. The electrical box assembly of claim 1 wherein said mounting arrangement includes apertures in said peripheral wall of said box member.

9. The electrical box assembly of claim 8 wherein
said peripheral wall of said box member includes sidewalls; and
said apertures are located in said sidewalls.

10. The electrical box assembly of claim 8 wherein
said peripheral wall of said box member includes an inner edge at a juncture with said back wall of said box member and an outer edge; and
said apertures in said peripheral wall of said box member are adjacent said inner edge.

11. The electrical box assembly of claim 1 wherein said attachment arrangement for securing said frame member to said box member includes
a plurality of bosses extending inward from said peripheral wall of said box member; and
a plurality of guide members extending inward from said peripheral flange of said frame member, whereby said guide members of said peripheral flange are in alignment with said bosses of said box member when said peripheral flange of said frame member is aligned with said peripheral wall of said box member.

12. The electrical box assembly of claim 1 wherein
said transverse flange of said frame member includes apertures therein; and
said apertures in said transverse flange for receipt of fasteners for mounting said frame member to the wall.

13. The electrical box assembly of claim 1 wherein said connection points for the low voltage components include connection points aligned for vertical connection of the low voltage components and connection points aligned for horizontal connection of the low voltage components.

14. A method of providing an enclosed recessed mounting area in a wall for accommodating high and low voltage components, including: providing an electrical box assembly including a box member having a forward extending peripheral wall and a back wall, said peripheral wall of said box member including a front edge, said back wall of said box member recessed a substantial distance from said front edge, said peripheral wall of said box member including a bottom wall and loop members in linear alignment along said bottom wall, a frame member including a rearward extending peripheral flange and a transverse flange, an electrical box extending from said back wall of said box member, said electrical box including sidewalls and a rear wall, connection points on said back wall of said box member for securing low voltage components thereto, a mounting arrangement for securing said box member to a stud and thereby positioning said back wall of said box member substantially within a wall, said mounting arrangement including apertures in said peripheral wall of said box member, and an attachment arrangement for securing said frame member to said box member;
a) cutting a hole in the wall covering adjacent a stud;
b) inserting said box member into the hole until said front edge of said peripheral wall of said box member is approximately flush with the surrounding wall;
c) inserting mounting fasteners through said apertures in said peripheral wall of said box member into the stud;
d) tightening the mounting fasteners into the stud to secure said box member to the wall; and
e) securing said frame member to said box member with said attachment arrangement.

15. An electrical box assembly for recessing electrical components within a wall comprising:
a one-piece box member including a forward extending peripheral wall, a flange extending transversely from said peripheral wall, and a back wall;
one or more openings in said back wall of said box member;
a first of said openings in said back wall of said box member including an electrical box therein, said electrical box including sidewalls integral with and extending rearward from said back wall of said box member;
said openings in said back wall of said box member including connection points on said back wall of said box member for securing the electrical components thereto;
a mounting arrangement for securing said box member to the wall whereby the electrical components are recessed within the wall;
said peripheral wall of said box member includes a bottom wall; and
loop members in linear alignment along said bottom wall.

* * * * *